United States Patent
Choudhury et al.

(10) Patent No.: US 11,922,130 B2
(45) Date of Patent: Mar. 5, 2024

(54) OPTIMIZATION OF ARITHMETIC EXPRESSIONS

(71) Applicant: International Business Machines Corporation, Armonk, NY (US)

(72) Inventors: Mihir Choudhury, Jersey City, NJ (US); Ayesha Akhter, Austin, TX (US); Alexander Ivrii, Haifa (IL); Robert Lowell Kanzelman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 17/547,413

(22) Filed: Dec. 10, 2021

(65) Prior Publication Data

US 2023/0185528 A1 Jun. 15, 2023

(51) Int. Cl.
*G06F 7/50* (2006.01)
*G06F 5/01* (2006.01)
*G06F 7/32* (2006.01)

(52) U.S. Cl.
CPC ............. *G06F 7/50* (2013.01); *G06F 5/01* (2013.01); *G06F 7/32* (2013.01)

(58) Field of Classification Search
CPC ...... G06F 7/32; G06F 7/38; G06F 7/50–5338; G06F 7/57; G06F 7/575; G06F 5/01; G06F 30/30–327; G06F 30/337
See application file for complete search history.

(56) References Cited

U.S. PATENT DOCUMENTS

| 5,175,843 | A | 12/1992 | Casavant | |
|---|---|---|---|---|
| 7,263,673 | B1 * | 8/2007 | McElvain | G06F 30/327 716/103 |
| 2016/0350469 | A1 * | 12/2016 | Amarù | G06F 30/398 |

OTHER PUBLICATIONS

A.K. Verma et al., Data-Flow Transformations to Maximize the Use of Carry-Save Representation in Arithmetic Circuits, IEEE Transactions on Computer-Aided Design of Integrated Circuits and Systems, vol. 27, No. 10, 2008 (Year: 2008).*

Hosangadi, Anup, "Optimization Techniques for Arithmetic Expressions", A Dissertation submitted in partial satisfaction of the requirements for the degree Doctor of Philosophy in Computer Engineering, University of California Santa Barbara, Jul. 2006, 173 pages.

Ienne et al., "Arithmetic Transformations to Maximize the Use of Compressor Trees," Proceedings, DELTA 2004, Second IEEE International Workshop on Electronic Design, Test and Applications, IEEE, 2004, pp. 219-224.

(Continued)

*Primary Examiner* — Emily E Larocque
(74) *Attorney, Agent, or Firm* — Aaron Pontikos

(57) ABSTRACT

In an approach for optimization of integer arithmetic expressions implemented as a Boolean logic circuit, a processor converts arithmetic operators in an arithmetic expression into adders. A processor identifies a topological order of the adders. A processor merges the adders based on the topological order into a multi-operand adder. A processor converts the multi-operand adder to a compressor tree and a two-operand adder. A processor performs the arithmetic expression based on the converted multi-operand adder.

11 Claims, 12 Drawing Sheets

(56) References Cited

OTHER PUBLICATIONS

Oklobdoja et al., "A Method for Speed Optimized Partial Product Reduction and Generation of Fast Multipliers Using and Algorithmic Approach", IEEE Transactions on Computers, vol. 45, No. 3, Mar. 1996, 13 pages.

Oklobdzija, Vojin G., "An Algorithmic and Novel Design of a Leading Zero Detector Circuit", IEEE Transactions on Very Large Scale Integration (VLSI) Systems, vol. 2. No. 1, Mar. 1994, 5 pages.

Stelling et al., "Optimal Circuits for Parallel Multipliers", IEEE Transactions on Computers, vol. 47, No. 3, Mar. 1998, 13 pages.

Verma et al., "Challenges in Automatic Optimization of Arithmetic Circuits", Proceedings of the 2009 19th IEEE International Symposium on Computer Arithmetic, Washington, DC, Jun. 8-10, 2009, 6 pages.

Verma et al., "Towards Automatic exploration of Arithmetic Circuit Architectures", Proceedings of the Design Automation Conference, Jul. 24-28, 2006, San Francisco, California, 6 pages.

\* cited by examiner

| Design | Without merge | With merge |
|---|---|---|
| (A + B) > C (2-bit) | Area : 60, Levels : 5 | Area : 68, Levels : 7 |
| (A + B) > C (4-bit) | Area : 160, Levels : 9 | Area : 206, Levels : 8 |
| (A + B) > C (8-bit) | Area : 435, Levels : 12 | Area : 426, Levels : 10 |
| (A + B) > C (16-bit) | Area : 1050, Levels : 17 | Area : 870, Levels : 12 |
| (A + B) > C (32-bit) | Area : 2638, Levels : 21 | Area : 1763, Levels : 13 |
| (A + B) > C (64-bit) | Area : 6014, Levels : 24 | Area : 3768, Levels : 16 |

FIG. 6

OPTIMIZATION OF ARITHMETIC EXPRESSIONS

BACKGROUND

The present disclosure relates generally to the field of optimization of integer arithmetic expressions, and more particularly to a design flow for optimization of integer arithmetic expressions implemented as a Boolean logic circuit.

Boolean logic may operate on the values true and false. Each bit of a binary number can be associated with a value from Boolean logic. A convention that "1" may used to represent true and "0" may be used to represent false may extend quite naturally to the representation of binary numbers on a computer as vectors of Boolean values. For example, a 32-bit binary number "a" as being composed of a vector of Boolean values a0 to a31, where the subscripts may indicate the power of two in the place-value system.

An adder may be a digital circuit that performs addition of numbers. In many computers and other kinds of processors adders may be used in arithmetic logic units. Adders may also be used in other parts of the processor, where the adders may be used to calculate addresses, table indices, increment and decrement operators and similar operations. Although adders can be constructed for many number representations, such as binary-coded decimal or excess-3, the most common adders operate on binary numbers. In cases where two's complement or ones' complement may be used to represent negative numbers, it is trivial to modify an adder into an adder-subtractor. Other signed number representations may require more logic around the basic adder.

SUMMARY

Aspects of an embodiment of the present disclosure disclose an approach for optimization of integer arithmetic expressions implemented as a Boolean logic circuit. A processor converts arithmetic operators in an arithmetic expression into adders. A processor identifies a topological order of the adders. A processor merges the adders based on the topological order into a multi-operand adder. A processor converts the multi-operand adder to a compressor tree and a two-operand adder. A processor performs the arithmetic expression based on the converted multi-operand adder.

BRIEF DESCRIPTION OF THE DRAWINGS

FIG. 6 illustrates exemplary benefits of a truncated sum merge in FIG. 5.

DETAILED DESCRIPTION

Figure 1:
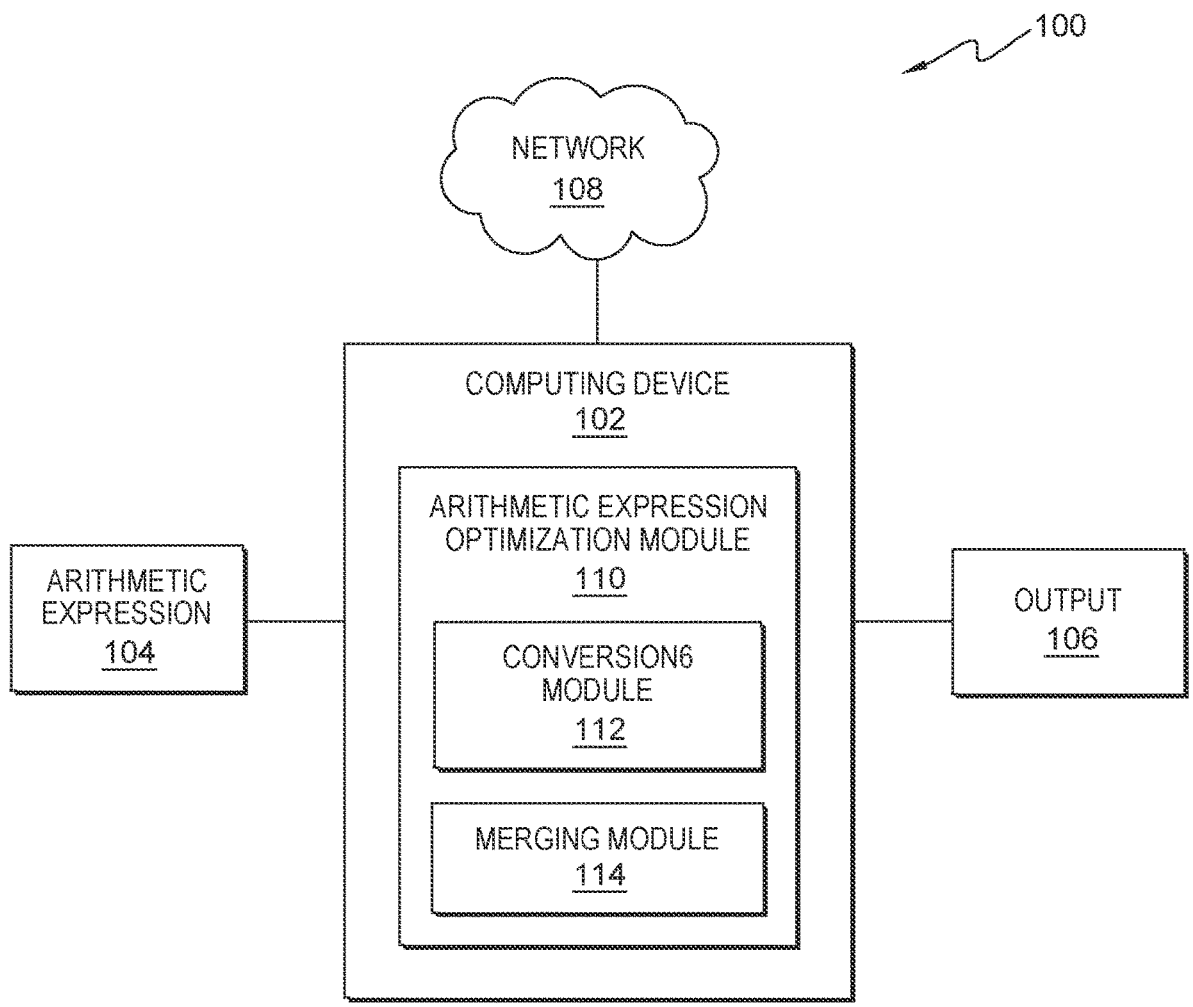
FIG. 1 is a functional block diagram illustrating an arithmetic expression optimization environment, in accordance with an embodiment of the present disclosure.

The present disclosure is directed to systems and methods for optimization of integer arithmetic expressions implemented as a Boolean logic circuit.

Embodiments of the present disclosure recognize a need for optimizing a design of computer chips involving binary logic that performs arithmetic operations such as add (+), subtract (−), multiply (*), compare (<, >, <=, >=), etc. Embodiments of the present disclosure disclose optimizing integer arithmetic expressions implemented as a Boolean logic circuit. Examples of expressions that can be optimized with the proposed technique include, for example, (a+b−c), (a+b>c), (a*b<=c), (a*b+c) and so on. Here a, b, and c may be integers expressed as a binary bit-vector.

Embodiments of the present disclosure disclose systems and methods based on transforms (e.g., functions) that allow merging of a sequence of adders. A sequence of adders may be a configuration in which output of an adder (the driver) is connected either directly or through an inversion to input of another adder (the source). Embodiments of the present disclosure disclose creating a larger adder (i.e., with more operands) which then can be implemented using compressor trees and can achieve fewer logic levels and smaller area footprint as compared to implementing the adder without merging. Embodiments of the present disclosure disclose adder merging that can be used as a verification technique to reason about the equivalence of two different configurations of adders. Embodiments of the present disclosure disclose transforms (e.g., functions) that enable adder merging. Embodiments of the present disclosure disclose optimizing designs containing arithmetic expressions using adder merging transforms.

Embodiments of the present disclosure disclose implementing arithmetic operators (e.g., subtract, multiply, unsigned compare) as adders. Embodiments of the present disclosure disclose identifying adders in a topological order connected in a serial manner (i.e., output of one adder connected to input of a second adder). Embodiments of the present disclosure disclose merging sequence of adders in a topological order from inputs to outputs using adder transforms. Embodiments of the present disclosure disclose implementing merged adders using compressor trees to obtain an implementation with fewer logic levels and smaller area footprint as compared to the standard implementation without merging of the different operators. Embodiments of the present disclosure disclose converting arithmetic operators (e.g., *, −, >, <, >=, <=) into adders. Embodiments of the present disclosure disclose, in a topological order, identifying adders connected in a serial manner. Embodiments of the present disclosure disclose applying transforms to merge cascaded adders into multi-operand adders. Embodiments of the present disclosure disclose converting a multi-operand adder to a compressor tree and a two-operand adder. Embodiments of the present disclosure disclose expanding two operand adders using carry-lookahead adder expansions. Embodiments of the present disclosure disclose performing bit-level optimization across operators of different types, e.g., multiply-adder, multiply-compare, adder-subtractor, adder-compare. Embodiments of the present disclosure disclose handling optimization of compare operators with adders, subtractors and multipliers.

The present disclosure will now be described in detail with reference to the Figures. FIG. 1 is a functional block diagram illustrating arithmetic expression optimization environment, generally designated 100, in accordance with an embodiment of the present disclosure.

In the depicted embodiment, arithmetic expression optimization environment 100 includes computing device 102, arithmetic expression 104, output 106, and network 108.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to arithmetic expression optimization module 110 and network 108 and is capable of processing program instructions and executing arithmetic expression optimization module 110, in accordance with an embodiment of the present disclosure. Computing device 102 may include internal and external hardware components, as depicted and described in further detail with respect to FIG. 12.

Further, in the depicted embodiment, computing device 102 includes arithmetic expression optimization module 110. In the depicted embodiment, arithmetic expression optimization module 110 is located on computing device 102. However, in other embodiments, arithmetic expression optimization module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and arithmetic expression optimization module 110, in accordance with a desired embodiment of the disclosure.

In one or more embodiments, arithmetic expression optimization module 110 is configured to convert arithmetic operators in arithmetic expression 104 into adders. Arithmetic expression optimization module 110 may implement the various arithmetic operators (e.g., subtract, multiply, unsigned compare) as adders. In general, an adder may be a digital circuit that performs addition of numbers. An adder may be a circuit that sums the amplitudes of two input signals. Adders may be used in arithmetic logic units. Adders may be used to calculate addresses, table indices, increment and decrement operators and similar operations. Adders can be constructed for many number representations, such as binary-coded decimal or excess-3. In another example, adders may operate on binary numbers. Binary logic may perform arithmetic operations such as add (+), subtract (−), multiply (*), compare (<, >, <=, >=), etc. Arithmetic expression optimization module 110 may optimize portions of designs containing arithmetic and data-path logic. In an example, arithmetic expression optimization module 110 may optimize integer arithmetic expressions implemented as a Boolean logic circuit. Examples of expressions that can be optimized include, for example, (a+b−c), (a+b>c), (a*b<=c), (a*b+c) and so on. In an example, a, b, and c may be integers expressed as a binary bit-vector.

In one or more embodiments, arithmetic expression optimization module 110 is configured to identify a topological order of the adders. Arithmetic expression optimization module 110 may identify the topological order of the adders connected in a serial manner (i.e., output of one adder connected to input of the second adder). For example, a sequence of adders may be a configuration in which the output of an adder (the driver) is connected either directly or through an inversion to the input of another adder (the source). In an example, a topological order may be a numbering of the vertices of a directed acyclic graph such that every edge from a vertex numbered i to a vertex numbered j satisfies i<j. A topological order of a directed graph may be a linear ordering of vertices such that for every directed edge uv from vertex u to vertex v, u comes before v in the ordering. For instance, the vertices of the graph may represent tasks to be performed, and the edges may represent constraints that one task must be performed before another.

In one or more embodiments, arithmetic expression optimization module 110 is configured to merge the adders based on the topological order into a multi-operand adder. Arithmetic expression optimization module 110 may merge sequence of adders in the topological order from inputs to outputs based on adder transforms. Example adder transforms are illustrated in FIGS. 3-11. A sequence of adders may be a configuration in which the outputs of an adder (the driver) are connected either directly or through an inversion to the inputs of another adder (the source). Adder transforms (e.g., adder functions) may enable merging of the sequence of adders. In an example, adder transforms may enable merging, for example, two adders into a larger single adder. Arithmetic expression optimization module 110 may create a larger adder (e.g., with more operands) which then can be implemented using compressor trees and achieve fewer logic levels and smaller area footprint as compared to implementing the adders without merging. Arithmetic expression optimization module 110 may merge the adders used as a verification technique to reason about the equivalence of two different configurations of adders.

In one or more embodiments, arithmetic expression optimization module 110 is configured to convert the multi-operand adder to a compressor tree and a two-operand adder. In an example, a compressor tree may be a class of circuits that generalizes multi-operand addition and the partial product reduction trees of parallel multipliers using carry-save arithmetic. Arithmetic expression optimization module 110 may implement the multi-operand adder using the compressor tree to obtain an implementation with fewer logic levels and smaller area footprint. Arithmetic expression optimization module 110 may expand the two-operand adder using carry-lookahead adder expansions. In an example, a carry-lookahead adder can be a type of electronics adder used in digital logic. A carry-lookahead adder may improve speed by reducing the amount of time required to determine carry bits. The carry-lookahead adder may calculate one or more carry bits before the sum, which may reduce the wait time to calculate the result of the larger-value bits of the adder. Arithmetic expression optimization module 110 may perform arithmetic expression 104 based on the converted multi-operand adder and may provide output 106.

Further, in the depicted embodiment, arithmetic expression optimization module 110 includes conversion module 112 and merging module 114. In the depicted embodiment, conversion module 112 and merging module 114 are located on computing device 102 and arithmetic expression optimization module 110. However, in other embodiments, conversion module 112 and merging module 114 may be located externally and accessed through a communication network such as network 108.

In one or more embodiments, conversion module 112 is configured to convert arithmetic operators in arithmetic expression 104 into adders. Conversion module 112 may implement the various arithmetic operators (e.g., subtract, multiply, unsigned compare) as adders. In general, an adder may be a digital circuit that performs addition of numbers. An adder may be a circuit that sums the amplitudes of two input signals. Adders may be used in arithmetic logic units. Adders may be used to calculate addresses, table indices, increment and decrement operators and similar operations. Adders can be constructed for many number representations, such as binary-coded decimal or excess-3. In another example, adders may operate on binary numbers. Binary logic may perform arithmetic operations such as add (+), subtract (−), multiply (*), compare (<, >, <=, >=), etc. Conversion module 112 may optimize portions of designs containing arithmetic and data-path logic. In an example, conversion module 112 may optimize integer arithmetic expressions implemented as a Boolean logic circuit. Examples of expressions that can be optimized include, for example, (a+b−c), (a+b>c), (a*b<=c), (a*b+c) and so on. In an example, a, b, and c may be integers expressed as a binary bit-vector.

In one or more embodiments, conversion module 112 is configured to identify a topological order of the adders. Conversion module 112 may identify the topological order of the adders connected in a serial manner (i.e., output of one adder connected to input of the second adder). For example, a sequence of adders may be a configuration in which the output of an adder (the driver) is connected either directly or through an inversion to the input of another adder (the source). In an example, a topological order may be a numbering of the vertices of a directed acyclic graph such that every edge from a vertex numbered i to a vertex numbered j satisfies i<j. A topological order of a directed graph may be a linear ordering of vertices such that for every directed edge uv from vertex u to vertex v, u comes before v in the ordering. For instance, the vertices of the graph may represent tasks to be performed, and the edges may represent constraints that one task must be performed before another.

In one or more embodiments, merging module 114 is configured to merge the adders based on the topological order into a multi-operand adder. Merging module 114 may merge sequence of adders in the topological order from inputs to outputs based on adder transforms. Example adder transforms are illustrated in FIGS. 3-11. A sequence of adders may be a configuration in which the outputs of an adder (the driver) are connected either directly or through an inversion to the inputs of another adder (the source). Adder transforms (e.g., adder functions) may enable merging of the sequence of adders. In an example, adder transforms may enable merging, for example, two adders into a larger single adder. Merging module 114 may create a larger adder (e.g., with more operands) which then can be implemented using compressor trees and achieve fewer logic levels and smaller area footprint as compared to implementing the adders without merging. Merging module 114 may merge the adders used as a verification technique to reason about the equivalence of two different configurations of adders.

In one or more embodiments, merging module 114 is configured to convert the multi-operand adder to a compressor tree and a two-operand adder. In an example, a compressor tree may be a class of circuits that generalizes multi-operand addition and the partial product reduction trees of parallel multipliers using carry-save arithmetic. Merging module 114 may implement the multi-operand adder using the compressor tree to obtain an implementation with fewer logic levels and smaller area footprint. Merging module 114 may expand the two-operand adder using carry-lookahead adder expansions. In an example, a carry-lookahead adder can be a type of electronics adder used in digital logic. A carry-lookahead adder may improve speed by reducing the amount of time required to determine carry bits. The carry-lookahead adder may calculate one or more carry bits before the sum, which may reduce the wait time to calculate the result of the larger-value bits of the adder. Merging module 114 may perform arithmetic expression 104 based on the converted multi-operand adder and may provide output 106.

Figure 2:
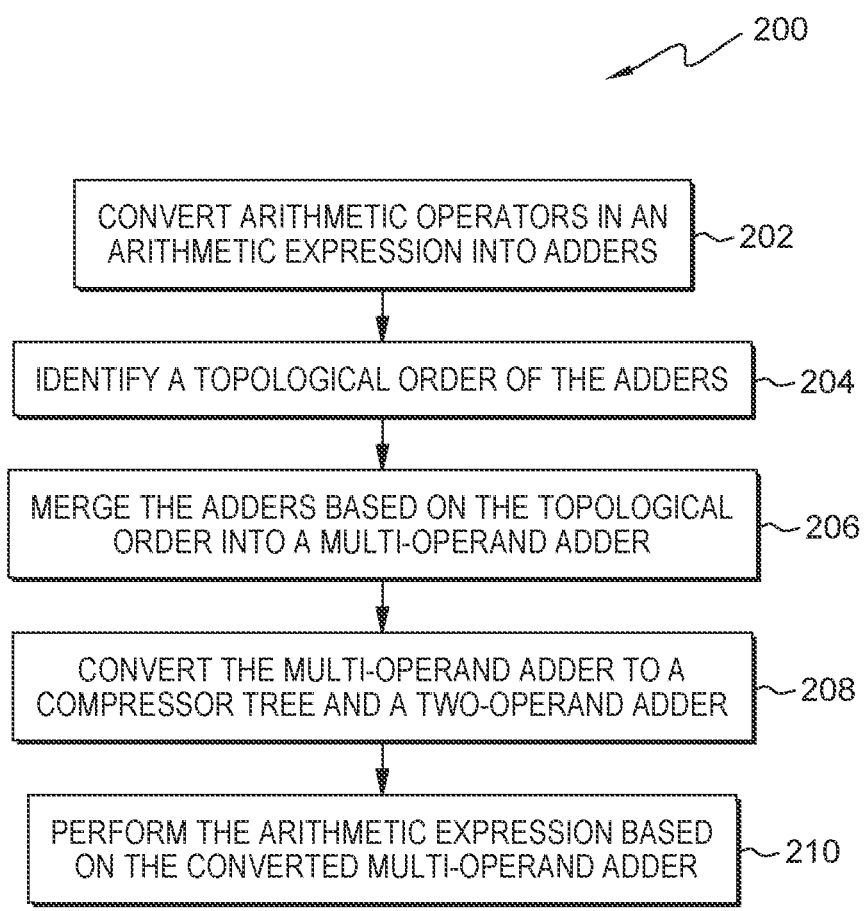
FIG. 2 is a flowchart depicting operational steps of an arithmetic expression optimization module within a computing device of FIG. 1, in accordance with an embodiment of the present disclosure.

FIG. 2 is a flowchart 200 depicting operational steps of arithmetic expression optimization module 110 in accordance with an embodiment of the present disclosure.

Arithmetic expression optimization module 110 operates to convert arithmetic operators in arithmetic expression 104 into adders. Arithmetic expression optimization module 110 also operates to identify a topological order of the adders. Arithmetic expression optimization module 110 operates to merge the adders based on the topological order into a multi-operand adder. Arithmetic expression optimization module 110 operates to convert the multi-operand adder to a compressor tree and a two-operand adder. Arithmetic expression optimization module 110 operates to perform arithmetic expression 104 based on the converted multi-operand adder and to provide output 106.

In step 202, arithmetic expression optimization module 110 converts arithmetic operators in arithmetic expression 104 into adders. Arithmetic expression optimization module 110 may implement the various arithmetic operators (e.g., subtract, multiply, unsigned compare) as adders. In general, an adder may be a digital circuit that performs addition of numbers. An adder may be a circuit that sums the amplitudes of two input signals. Adders may be used in arithmetic logic units. Adders may be used to calculate addresses, table indices, increment and decrement operators and similar operations. Adders can be constructed for many number representations, such as binary-coded decimal or excess-3. In another example, adders may operate on binary numbers. Binary logic may perform arithmetic operations such as add (+), subtract (−), multiply (*), compare (<, >, <=, >=), etc. Arithmetic expression optimization module 110 may optimize portions of designs containing arithmetic and data-path logic. In an example, arithmetic expression optimization module 110 may optimize integer arithmetic expressions implemented as a Boolean logic circuit. Examples of expressions that can be optimized include, for example, (a+b−c), (a+b>c), (a*b<=c), (a*b+c) and so on. In an example, a, b, and c may be integers expressed as a binary bit-vector.

In step 204, arithmetic expression optimization module 110 identifies a topological order of the adders. Arithmetic expression optimization module 110 may identify the topological order of the adders connected in a serial manner (i.e., output of one adder connected to input of the second adder). For example, a sequence of adders may be a configuration in which the output of an adder (the driver) is connected either directly or through an inversion to the input of another adder (the source). In an example, a topological order may be a numbering of the vertices of a directed acyclic graph such that every edge from a vertex numbered i to a vertex numbered j satisfies i<j. A topological order of a directed graph may be a linear ordering of vertices such that for every directed edge uv from vertex u to vertex v, u comes before v in the ordering. For instance, the vertices of the graph may represent tasks to be performed, and the edges may represent constraints that one task must be performed before another.

In step 206, arithmetic expression optimization module 110 merges the adders based on the topological order into a multi-operand adder. Arithmetic expression optimization module 110 may merge sequence of adders in the topological order from inputs to outputs based on adder transforms. Example adder transforms are illustrated in FIGS. 3-11. A sequence of adders may be a configuration in which the outputs of an adder (the driver) are connected either directly or through an inversion to the inputs of another adder (the source). Adder transforms (e.g., adder functions) may enable merging of the sequence of adders. In an example, adder transforms may enable merging, for example, two adders into a larger single adder. Arithmetic expression optimization module 110 may create a larger adder (e.g., with more operands) which then can be implemented using compressor trees and achieve fewer logic levels and smaller area footprint as compared to implementing the adders without merging. Arithmetic expression optimization module 110 may merge the adders used as a verification technique to reason about the equivalence of two different configurations of adders.

In step 208, arithmetic expression optimization module 110 converts the multi-operand adder to a compressor tree and a two-operand adder. In an example, a compressor tree may be a class of circuits that generalizes multi-operand addition and the partial product reduction trees of parallel multipliers using carry-save arithmetic. Arithmetic expression optimization module 110 may implement the multi-operand adder using the compressor tree to obtain an implementation with fewer logic levels and smaller area footprint. Arithmetic expression optimization module 110 may expand the two-operand adder using carry-lookahead adder expansions. In an example, a carry-lookahead adder can be a type of electronics adder used in digital logic. A carry-lookahead adder may improve speed by reducing the amount of time required to determine carry bits. The carry-lookahead adder may calculate one or more carry bits before the sum, which may reduce the wait time to calculate the result of the larger-value bits of the adder. In step 210, arithmetic expression optimization module 110 performs arithmetic expression 104 based on the converted multi-operand adder and provides output 106.

Figure 3:
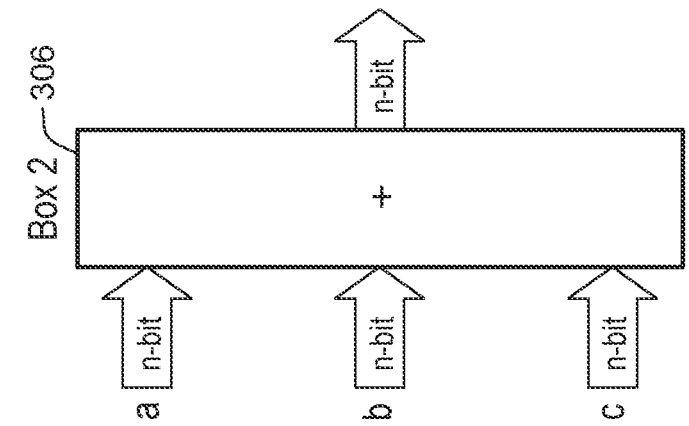
FIG. 3 illustrates an exemplary functional diagram of adder merging transformation of the arithmetic expression optimization module within the computing device of FIG. 1, in accordance with an embodiment of the present disclosure.
Figure 3:
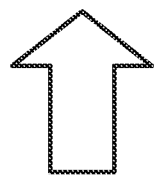
Figure 3:
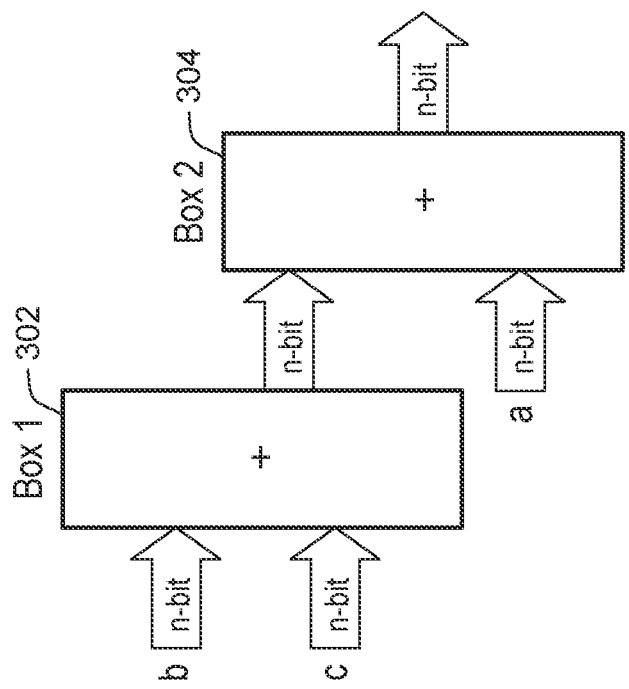

FIG. 3 illustrates an exemplary functional diagram of adder merging transformation of arithmetic expression optimization module 110, in accordance with an embodiment of the present disclosure.

In the example of FIG. 3, initially, box 1 and box 2 are two operand n-bit adders 302, 304. After the merge, the operands of box 1 are added to box 2 to make box 2 a three-operand n-bit adder 306. In this case, after the merge box 1 is removed.

Figure 4:
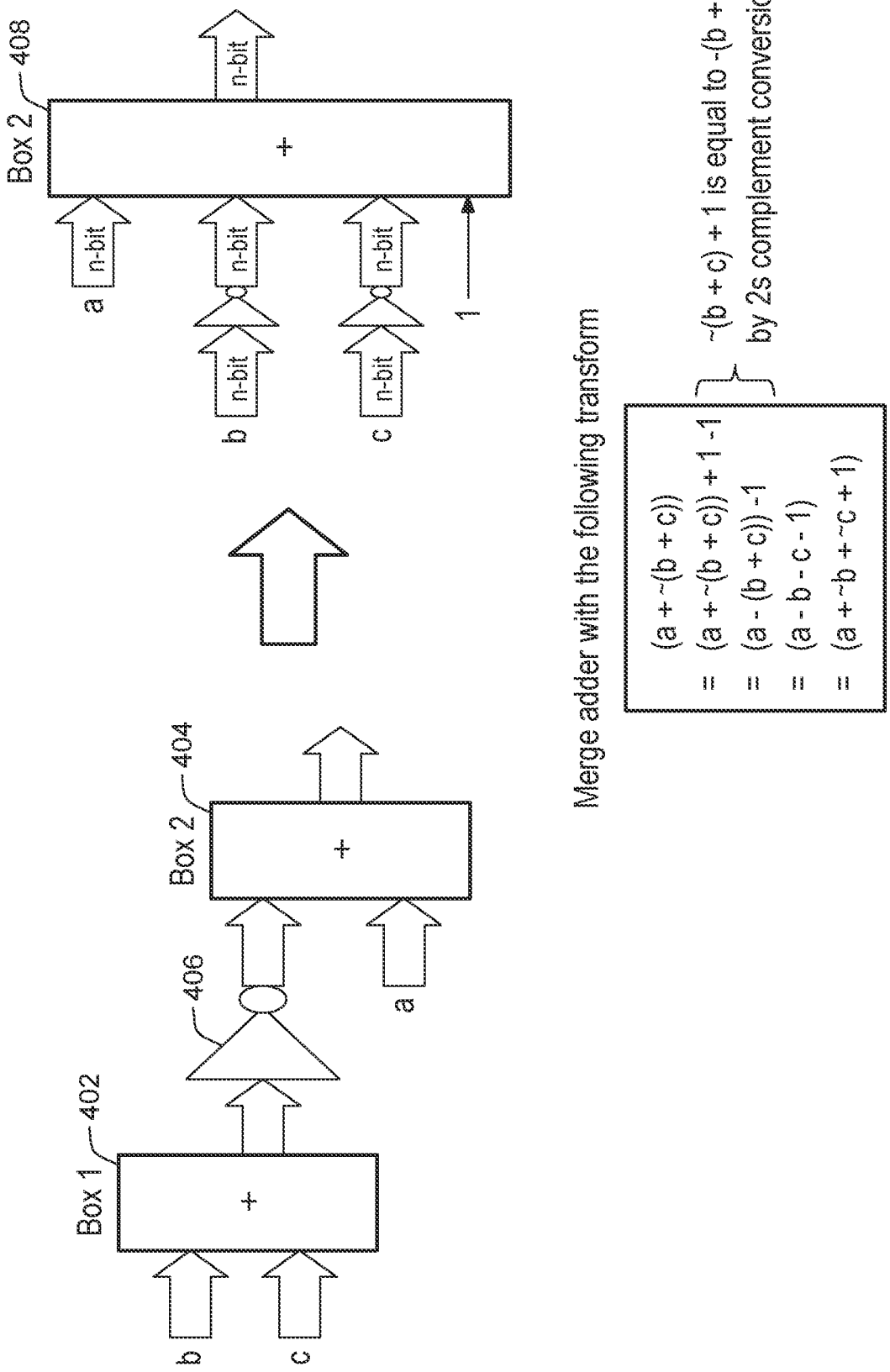
FIG. 4 illustrates an exemplary functional diagram of adder merging transformation with inversion of the arithmetic expression optimization module within the computing device of FIG. 1, in accordance with an embodiment of the present disclosure.

FIG. 4 illustrates an exemplary functional diagram of adder merging transformation with inversion of arithmetic expression optimization module 110, in accordance with an embodiment of the present disclosure.

In the example of FIG. 4, box 1 and box 2 are still two operand n-bit adders 402, 404. However, box 1 is connected to box 2 through inversion 406. This case can arise, for instance, in an expression such as (a−(b+c)). In the example, a two's (2s) complement may be used for conversion of inversion to subtraction. A two's complement is a mathematical operation on binary numbers as a method of signed number representation. In the example, the subtract operator may be flattened into the add operator and the two's complement is applied to subtrahend of the subtract operator. After the merge, the operands of box 1 are added to box 2 to make box 2 a three-operand n-bit adder 408.

Figure 5:
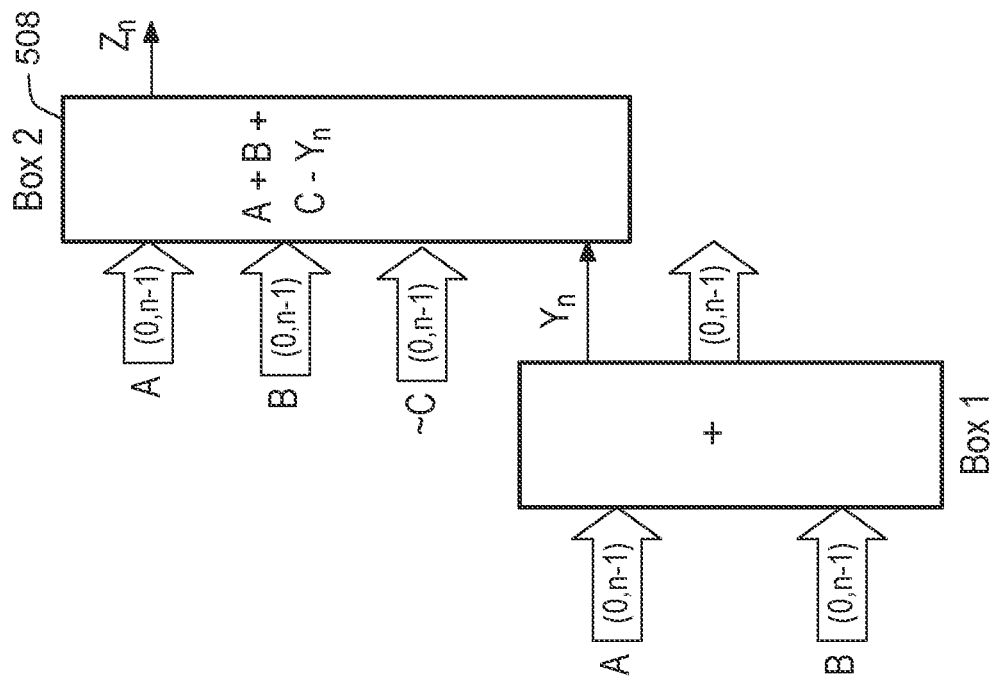
FIG. 5 illustrates an exemplary functional diagram of adder merging transformation with truncated sum of the arithmetic expression optimization module within the computing device of FIG. 1, in accordance with an embodiment of the present disclosure.
Figure 5:
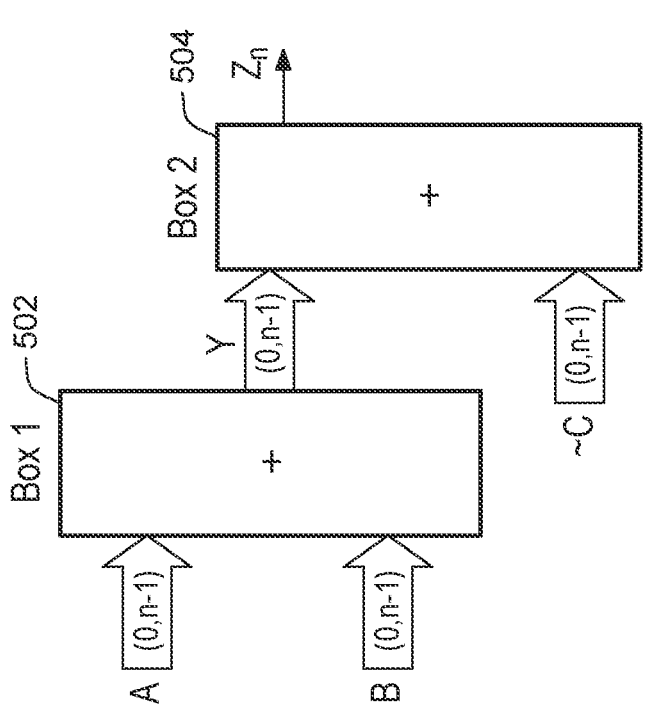

FIG. 5 illustrates an exemplary functional diagram of adder merging transformation with truncated sum of arithmetic expression optimization module 110, in accordance with an embodiment of the present disclosure. FIG. 6 illustrates exemplary benefits of truncated sum merge in (a+b)>c in FIG. 5.

In the example of FIG. 5, box 1 and box 2 are two operand n-bit adders 502, 504. Bit 0 is the least significant bit and bit n−1 is the most significant bit of the inputs of the two adders 502, 504. The output of this example is bit n of Box 2. Since there is no bit n in the inputs of box 1 and box 2 the inputs are assumed to be 0. This scenario arises, for instance, in an expression such as (a+b)>c. When the '>' operator is converted to an adder the value of the compare is stored in the carry-out of the adder. It should be noted that a simple merge of the operands of box 1 into box 2 will result in an incorrect function. This is because the carry-out (bit n) of box 1 is effectively being ignored or truncated. Thus, after merging operands of box 1 into box 2, the truncated bit of box 1 must be subtracted to ensure correct functionality. After the merge, the operands of box 1 are added to box 2 to make box 2 three-operand n-bit adder 508. As shown in FIG. 6, performance (e.g., indicated by "area" and "level") has been improved with merge, for example, when n is 8 or greater than 8. As indicated in FIG. 6, the smaller "area" and "level" are, the better the performance is.

Figure 7:
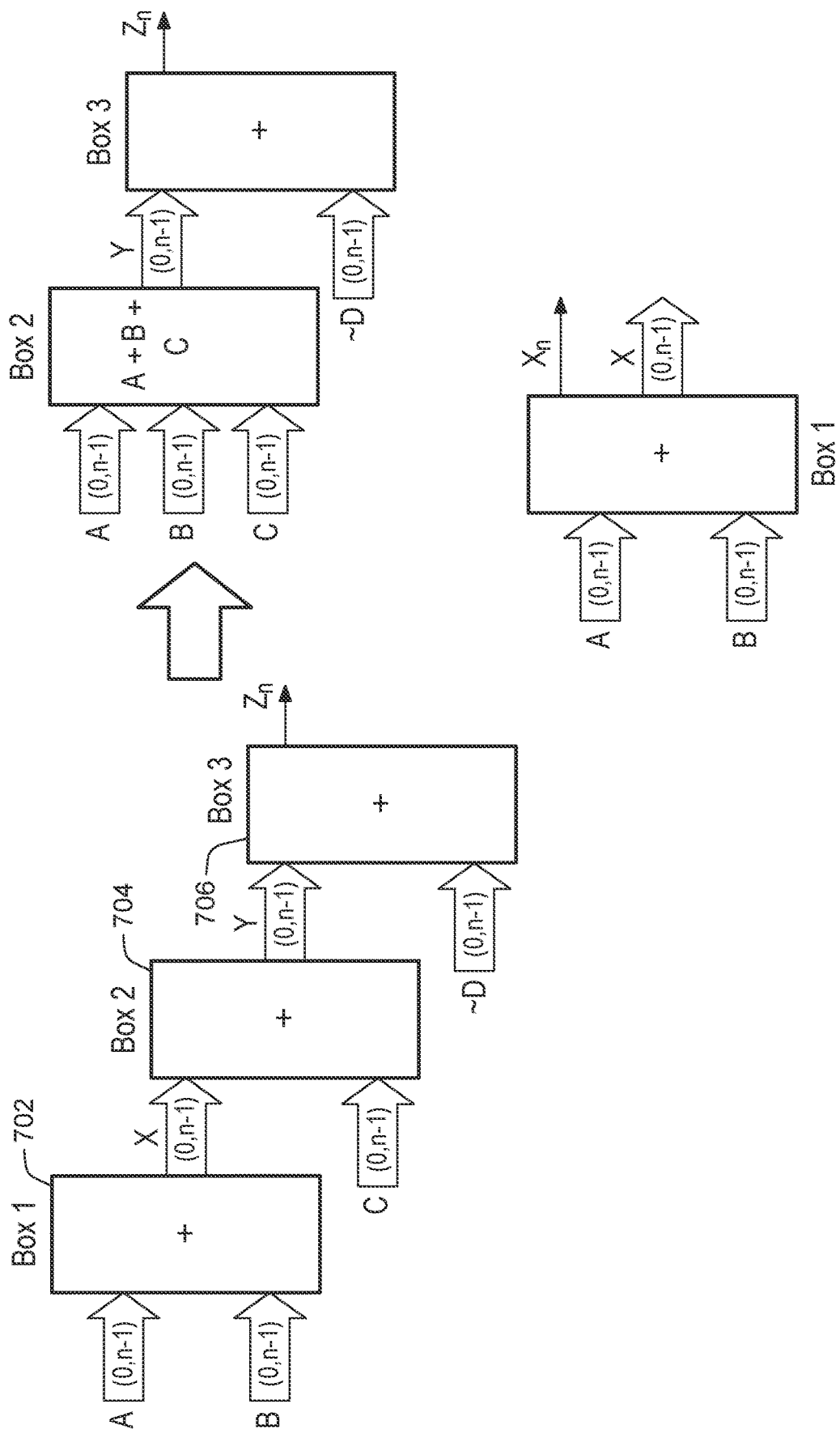
FIGS. 7-8 illustrate another exemplary functional diagram of adder merging transformation with truncated sum of the arithmetic expression optimization module within the computing device of FIG. 1, in accordance with an embodiment of the present disclosure.
Figure 8:
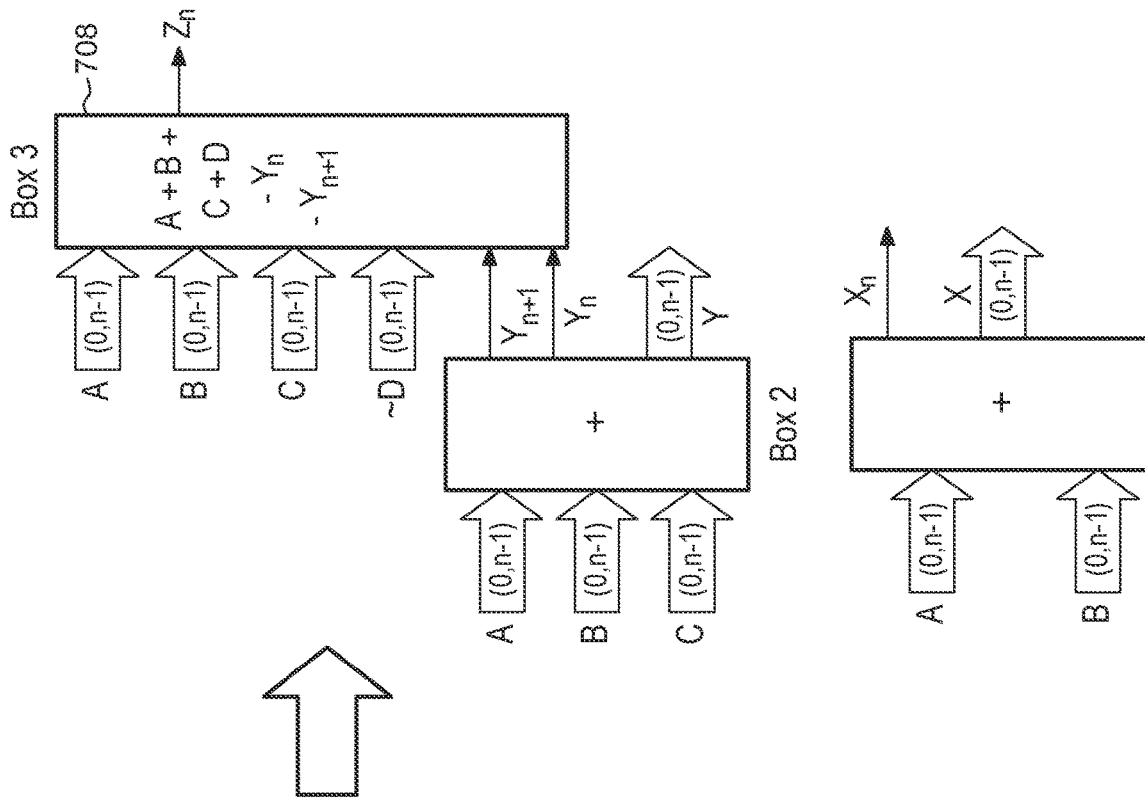
Figure 8:
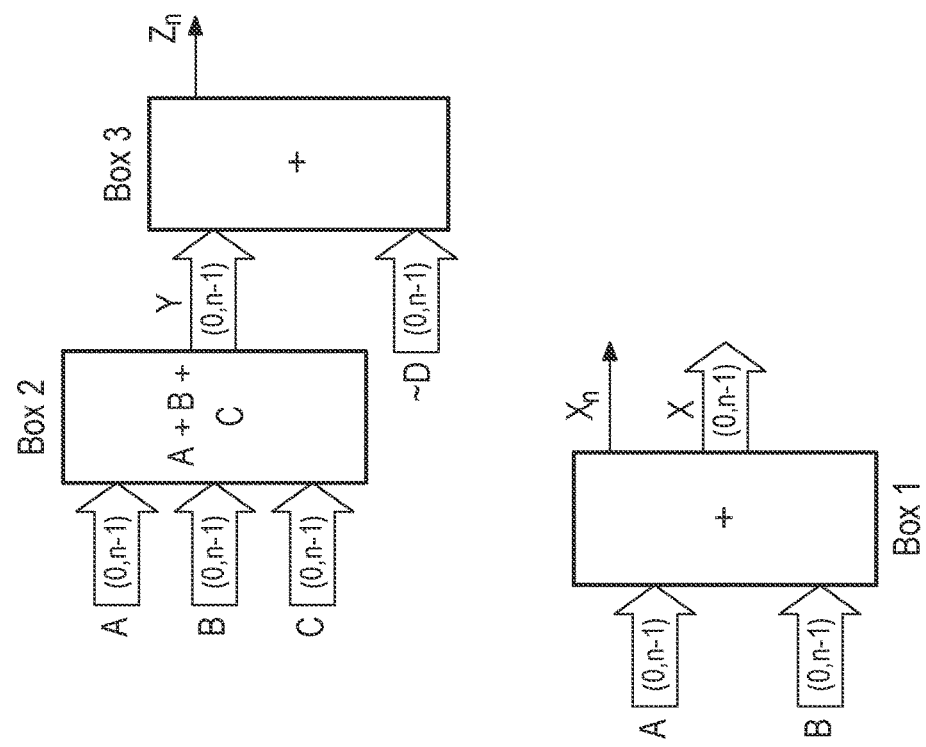

FIGS. 7-8 illustrate another exemplary functional diagram of adder merging transformation with truncated sum of arithmetic expression optimization module 110, in accordance with an embodiment of the present disclosure.

FIGS. 7-8 illustrate truncated sum merge (a+b+c>d). In the example of FIGS. 7-8, box 1, box 2 and box 3 are two operand n-bit adders 702, 704, 706. Bit 0 is the least significant bit and bit n−1 is the most significant bit of the inputs of adders 702, 704, 706. This scenario arises, for instance, in an expression such as (a+b+c>d. When the '>' operator is converted to an adder the value of the compare is stored in the carry-out of the adder. Thus, after merging operands of box 1 into box 2, the truncated bit of box 1 must be subtracted to ensure correct functionality. After the merge, the output becomes multi-operand adder 708.

Figure 9:
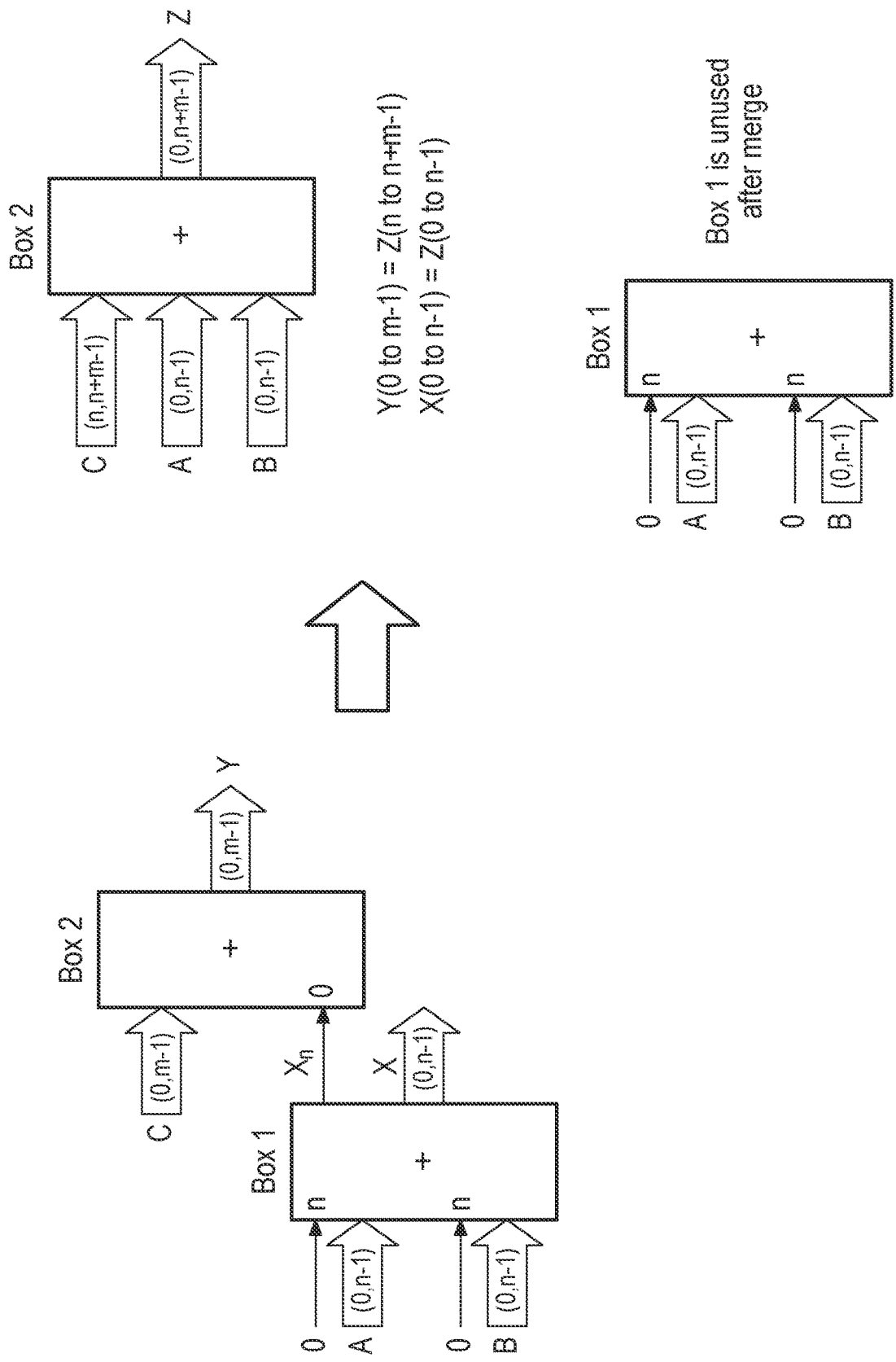
FIG. 9 illustrates an exemplary functional diagram of adder merging transformation with shifted merge of the arithmetic expression optimization module within the computing device of FIG. 1, in accordance with an embodiment of the present disclosure.

FIG. 9 illustrates an exemplary functional diagram of adder merging transformation with shifted merge of arithmetic expression optimization module 110, in accordance with an embodiment of the present disclosure.

FIG. 9 illustrates a variation of adder merge involving operand shifting. The most significant bit of adder box 1 is connected to the least significant input of adder box 2. A shifted merge happens in the same manner as a normal merge. The difference is that the input and output operands of the input adder (in this case box 1) are shifted by the same value when the input and output operands are merged into the output adder (in this case box 2). In this example the value of the shift is −n (output bit index−input bit index). Thus, when box 1 is merged into box 2, the operands of box 1 are shifted by −n. After normalizing all the bit indices of the merged adder so that bit indices are non-negative, the merged adder box 2 is shown on the right in FIG. 9.

Figure 10:
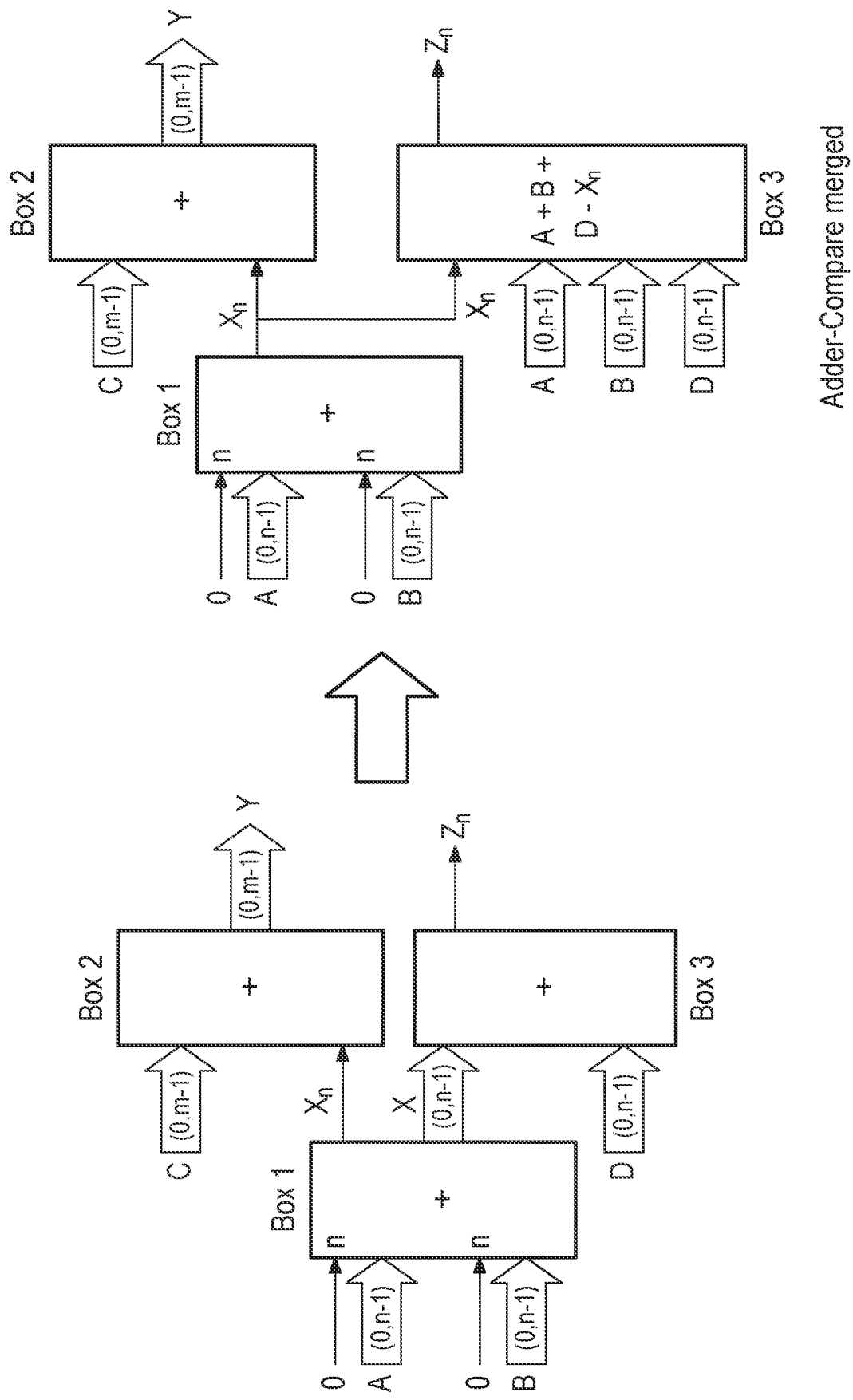
FIGS. 10-11 illustrate an exemplary functional diagram of adder merging transformation with shifted merge and adder-compare merge of the arithmetic expression optimization module within the computing device of FIG. 1, in accordance with an embodiment of the present disclosure.
Figure 11:
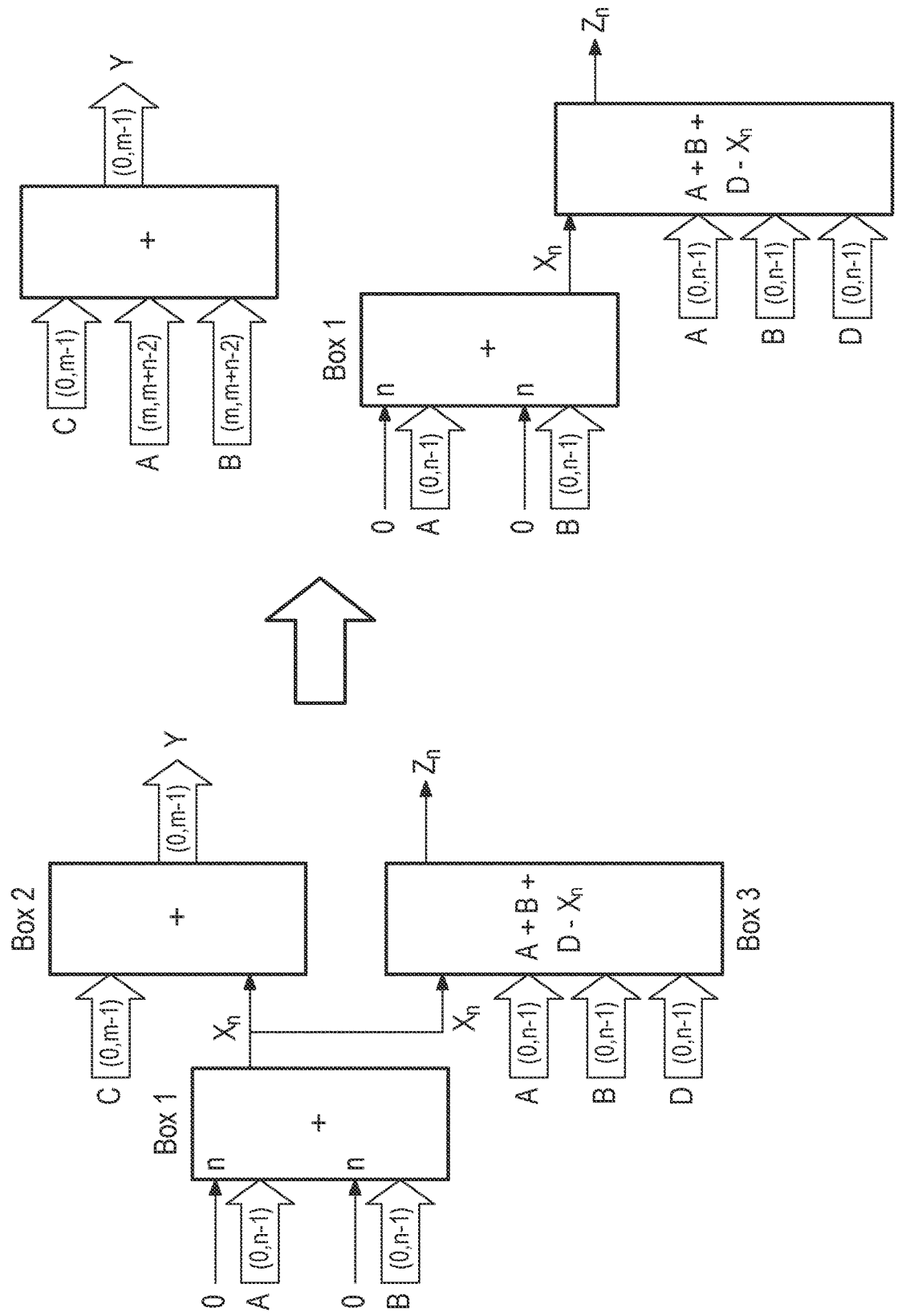

FIGS. 10-11 illustrate an exemplary functional diagram of adder merging transformation with shifted merge and adder-compare merge of arithmetic expression optimization module 110, in accordance with an embodiment of the present disclosure. FIGS. 10-11 illustrate a compound scenario that contains both shifted and truncated operand merges.

Figure 12:
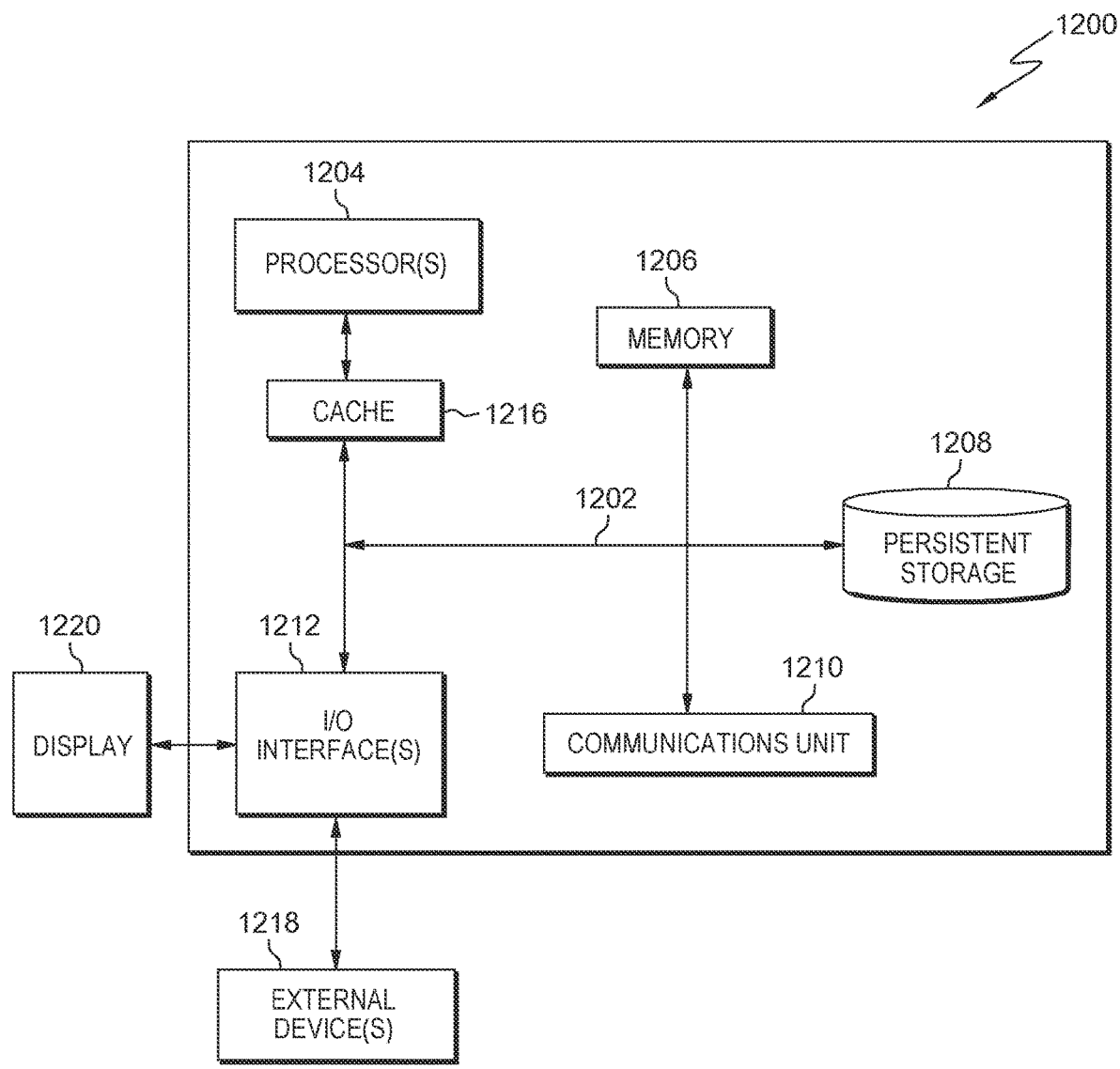
FIG. 12 is a block diagram of components of the computing device of FIG. 1, in accordance with an embodiment of the present disclosure.

FIG. 12 depicts a block diagram 1200 of components of computing device 102 in accordance with an illustrative embodiment of the present disclosure. It should be appreciated that FIG. 12 provides only an illustration of one implementation and does not imply any limitations with regard to the environments in which different embodiments may be implemented. Many modifications to the depicted environment may be made.

Computing device 102 may include communications fabric 1202, which provides communications between cache 1216, memory 1206, persistent storage 1208, communications unit 1210, and input/output (I/O) interface(s) 1212. Communications fabric 1202 can be implemented with any architecture designed for passing data and/or control information between processors (such as microprocessors, communications and network processors, etc.), system memory, peripheral devices, and any other hardware components within a system. For example, communications fabric 1202 can be implemented with one or more buses or a crossbar switch.

Memory 1206 and persistent storage 1208 are computer readable storage media. In this embodiment, memory 1206 includes random access memory (RAM). In general, memory 1206 can include any suitable volatile or non-volatile computer readable storage media. Cache 1216 is a fast memory that enhances the performance of computer processor(s) 1204 by holding recently accessed data, and data near accessed data, from memory 1206.

Arithmetic expression optimization module 110 may be stored in persistent storage 1208 and in memory 1206 for execution by one or more of the respective computer processors 1204 via cache 1216. In an embodiment, persistent storage 1208 includes a magnetic hard disk drive. Alternatively, or in addition to a magnetic hard disk drive, persistent storage 1208 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 1208 may also be removable. For example, a removable hard drive may be used for persistent storage 1208. Other examples include optical and magnetic disks, thumb drives, and smart cards that are inserted into a drive for transfer onto another computer readable storage medium that is also part of persistent storage 1208.

Communications unit 1210, in these examples, provides for communications with other data processing systems or devices. In these examples, communications unit 1210 includes one or more network interface cards. Communications unit 1210 may provide communications through the use of either or both physical and wireless communications links. Arithmetic expression optimization module 110 may be downloaded to persistent storage 1208 through communications unit 1210.

I/O interface(s) 1212 allows for input and output of data with other devices that may be connected to computing device 102. For example, I/O interface 1212 may provide a connection to external devices 1218 such as a keyboard, keypad, a touch screen, and/or some other suitable input device. External devices 1218 can also include portable computer readable storage media such as, for example, thumb drives, portable optical or magnetic disks, and memory cards. Software and data used to practice embodiments of the present invention, e.g., arithmetic expression optimization module 110 can be stored on such portable computer readable storage media and can be loaded onto persistent storage 1208 via I/O interface(s) 1212. I/O interface(s) 1212 also connect to display 1220.

Display 1220 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for executing arithmetic operations via an arithmetic logic unit, comprising:

converting, by one or more processors, arithmetic operators in an arithmetic expression into adders, such that all arithmetic operators in the arithmetic expression are adders;

identifying, by one or more processors, a topological order of the adders in the arithmetic expression, wherein the topological order of the adders includes a first adder followed by a second adder, and further wherein bit indexes between the first adder and the second adder are misaligned;

merging, by one or more processors, the first adder and the second adder into a multi-operand adder based, at least in part, on:

shifting input and output operands of the first adder by a same value of the misalignment between the bit indexes between the first adder and the second adder during the merging; and normalizing all bit indexes of the multi-operand adder such that the bit indexes of the multi-operand adder are non-negative;

converting, by one or more processors, the multi-operand adder to a compressor tree and a two-operand adder; and performing, by one or more processors, the arithmetic expression based on the converted multi-operand adder.

2. The computer-implemented method of claim 1, further comprising:

performing, by one or more processors, bit-level optimization across the arithmetic operators in the arithmetic expression converted into the adders.

3. The computer-implemented method of claim 1, wherein the multi-operand adder is a three or more operand n-bit adder.

4. The computer-implemented method of claim 1, wherein merging the adders further comprises merging with a truncated sum.

5. A computer program product for executing arithmetic operations via an arithmetic logic unit, comprising:

one or more computer readable storage media, and program instructions collectively stored on the one or more computer readable storage media, the program instructions comprising:

program instructions to convert arithmetic operators in an arithmetic expression into adders, such that all arithmetic operators in the arithmetic expression are adders;

program instructions to identify a topological order of the adders in the arithmetic expression, wherein the topological order of the adders includes a first adder followed by a second adder, and further wherein bit indexes between the first adder and the second adder are misaligned;

program instructions to merge the first adder and the second adder into a multi-operand adder based, at least in part, on:

shifting input and output operands of the first adder by a same value of the misalignment between the bit indexes between the first adder and the second adder during the merging; and normalizing all bit indexes of the multi-operand adder such that the bit indexes of the multi-operand adder are non-negative;

program instructions to convert the multi-operand adder to a compressor tree and a two-operand adder; and program instructions to perform the arithmetic expression based on the converted multi-operand adder.

6. The computer program product of claim 5, further comprising:

program instructions to perform bit-level optimization across the arithmetic operators in the arithmetic expression converted into the adders.

7. The computer program product of claim 5, wherein the multi-operand adder is a three or more operand n-bit adder.

8. The computer program product of claim 5, wherein program instructions to merge the adders further comprises merging with a truncated sum.

9. A computer system for executing arithmetic operations via an arithmetic logic unit, comprising:

one or more computer processors, one or more computer readable storage media, and program instructions stored on the one or more computer readable storage media for execution by at least one of the one or more computer processors, the program instructions comprising:

program instructions to convert arithmetic operators in an arithmetic expression into adders, such that all arithmetic operators in the arithmetic expression are adders;

program instructions to identify a topological order of the adders in the arithmetic expression, wherein the topological order of the adders includes a first adder followed by a second adder, and further wherein bit indexes between the first adder and the second adder are misaligned;

program instructions to merge the first adder and the second adder into a multi-operand adder based, at least in part, on:

shifting input and output operands of the first adder by a same value of the misalignment between the bit indexes between the first adder and the second adder during the merging; and normalizing all bit indexes of the multi-operand adder such that the bit indexes of the multi-operand adder are non-negative;

program instructions to convert the multi-operand adder to a compressor tree and a two-operand adder; and program instructions to perform the arithmetic expression based on the converted multi-operand adder.

10. The computer system of claim 9, further comprising:

program instructions to perform bit-level optimization across the arithmetic operators in the arithmetic expression converted into the adders.

11. The computer system of claim 9, wherein the multi-operand adder is a three or more operand n-bit adder.

* * * * *